United States Patent
Fuchs et al.

(10) Patent No.: US 8,222,998 B2
(45) Date of Patent: Jul. 17, 2012

(54) ARRANGEMENT AND METHOD FOR DATA ACQUISITION

(75) Inventors: Nikolaus Fuchs, Pressbaum (AT); Peter Hagl, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 578 days.

(21) Appl. No.: 12/513,922

(22) PCT Filed: Oct. 16, 2007

(86) PCT No.: PCT/EP2007/060991
§ 371 (c)(1),
(2), (4) Date: May 7, 2009

(87) PCT Pub. No.: WO2008/055761
PCT Pub. Date: May 15, 2008

(65) Prior Publication Data
US 2010/0039231 A1    Feb. 18, 2010

(30) Foreign Application Priority Data
Nov. 8, 2006   (DE) .......................... 10 2006 052 708

(51) Int. Cl.
*H04Q 5/22* (2006.01)
(52) U.S. Cl. .................. 340/10.1; 340/10.33; 340/10.34
(58) Field of Classification Search .................. 340/10.1, 340/10.2, 10.3, 10.31, 10.32, 10.33, 10.34, 340/10.4, 10.41, 572.1, 572.7
See application file for complete search history.

(56) References Cited

U.S. PATENT DOCUMENTS

| 6,661,336 | B1 * | 12/2003 | Atkins et al. ................. 340/10.2 |
| 2003/0179077 | A1 | 9/2003 | Hartmann et al. |
| 2006/0001585 | A1 | 1/2006 | Saito et al. |
| 2006/0097848 | A1 * | 5/2006 | Davidson et al. ............ 340/10.2 |
| 2006/0273882 | A1 * | 12/2006 | Posamentier ................ 340/10.4 |
| 2010/0237996 | A1 * | 9/2010 | Turner .......................... 340/10.1 |

FOREIGN PATENT DOCUMENTS

| DE | 202004007819 U1 | 7/2005 |
| EP | 1280092 B1 | 11/2004 |
| EP | 1610258 A1 | 12/2005 |

* cited by examiner

*Primary Examiner* — Nabil Syed
(74) *Attorney, Agent, or Firm* — King & Spalding L.L.P.

(57) ABSTRACT

In an arrangement and the associated method for the acquisition of data between at least one detection unit E1, E2, En and at least one means RFID1, RFID2, . . . RFIDn arranged in the electromagnetic alternating field EMF1, EMF2, . . . EMFn of the detection unit E1, E2, . . . En, for example an electronic data carrier, the means RFID1, RFID2, . . . RFIDn only submits data of a field intensity threshold value Emax of the electromagnetic alternating field EMF1, EMF2, . . . EMFn is exceeded. The data is received by the detection unit E1, E2, . . . E3. The field intensity of the electromagnetic alternating field EMF1, EMF2, . . . EMFn is designed such that within a predetermined unit of volume VE the field intensity threshold value Emax is exceeded for a predetermined amount of time t.

12 Claims, 4 Drawing Sheets

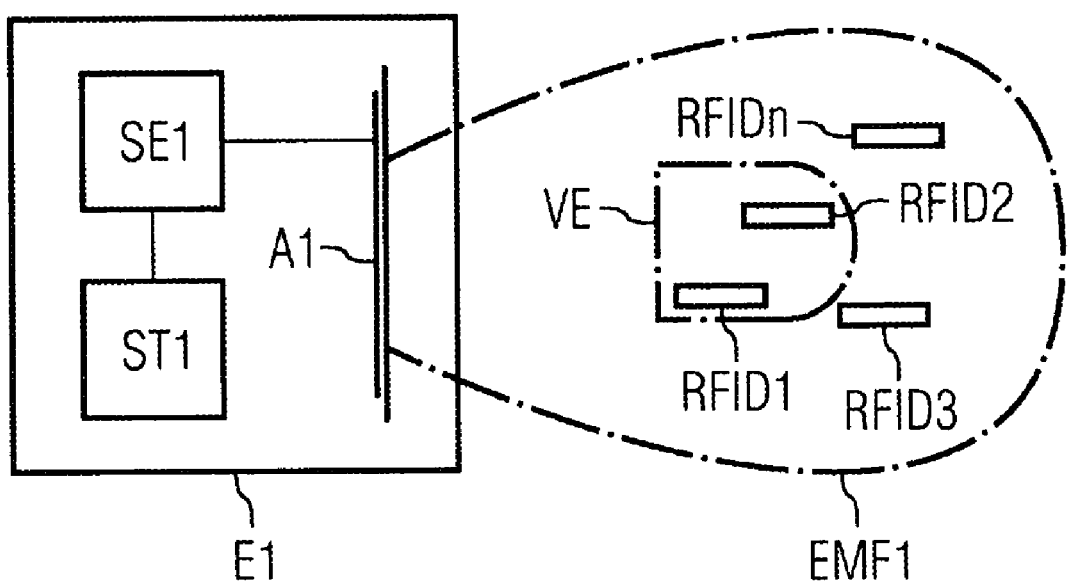

ARRANGEMENT AND METHOD FOR DATA ACQUISITION

CROSS-REFERENCE TO RELATED APPLICATIONS

This application is a United States national phase filing under 35 U.S.C. §371 of International Application No. PCT/EP2007/060991, filed Oct. 16, 2007 which claims priority to German Patent Application No. 10 2006 052 708.9, filed Nov. 8, 2006. The complete disclosure of the above-identified application is hereby fully incorporated herein by reference.

TECHNICAL FIELD

The invention relates to an arrangement and a method for data acquisition.

BACKGROUND

Almost all commercial goods are provided with a barcode for unique and simple identification. Progress in the areas of automation and the simplification of goods recognition has resulted in the barcodes being replaced by electronic data carriers, for example auto identification devices or radio frequency identification devices. For electronic data carriers to be able to output data which is received by a detection unit, they must be located for example in an electromagnetic alternating field of the detection unit. A detection device of this type is already known from the utility model publication DE 20 2005 014 644 U1. This describes how a large enough voltage is induced in the data carriers, when the field strength of the electromagnetic alternating field is sufficiently large, for all the data carriers to be activated and data to be output.

If a large number of data carriers are located within the electromagnetic alternating field of the detection unit however, this results in a large number of simultaneous data outputs by the data carriers. The data output signals of the data carriers can then interfere with one another or are not received correctly by the detection unit.

The detection device from DE 20 2005 014 644 U1 therefore has the disadvantage that data acquisition is not possible where there is a large concentration of data carriers.

SUMMARY

According to various embodiments, an arrangement and method can be specified, which avoid this disadvantage and allow interference-free data acquisition.

According to an embodiment, in an arrangement for data acquisition between at least two detection units and at least one means disposed in the electromagnetic alternating field of the detection units, the means are operable to only output data when a field strength threshold value is exceeded, and the data being detected by at least one detection unit, and the electromagnetic alternating fields of the at least two detection units being superimposed in such a manner that the field strength threshold value is exceeded for a time segment within a volume unit.

According to a further embodiment, the electromagnetic alternating fields of the at least two detection units can be superimposed in such a manner and at least one of the transmit power and phase of at least one detection unit can be changed in such a manner that the field strength threshold value is exceeded for a time segment within a volume unit. According to a further embodiment, at least one means can be configured in such a manner that it outputs data after a predeterminable delay time. According to a further embodiment, at least one means can be configured in such a manner that after the respective activated means has output data, it cannot output any further data for a predeterminable time segment.

According to another embodiment, a method for transmitting data between at least two detection units and at least one means disposed in the electromagnetic alternating field of each detection unit, may comprise the step of only outputting data by the at least one means when a field strength threshold value is exceeded and the electromagnetic alternating fields of the at least two detection units being superimposed in such a manner that the field strength threshold value is exceeded for a time segment within a volume unit.

According to a further embodiment, the electromagnetic alternating fields of the at least two detection units may be superimposed in such a manner and at least one of the transmit power and phase of at least one detection unit may be changed in such a manner that the field strength threshold value is exceeded for a time segment within a volume unit. According to a further embodiment, after an activated means has output data, it cannot output any further data for a predeterminable time segment. According to a further embodiment, an activated means may only output data if the detection unit has previously transmitted a characteristic identifier for the activated means.

BRIEF DESCRIPTION OF THE DRAWINGS

Further particular features of the invention will emerge from the descriptions which follow of a number of exemplary embodiments with reference to drawings, in which:

FIG. 1: shows a block diagram of a data acquisition arrangement,

DETAILED DESCRIPTION

Figure 2A:
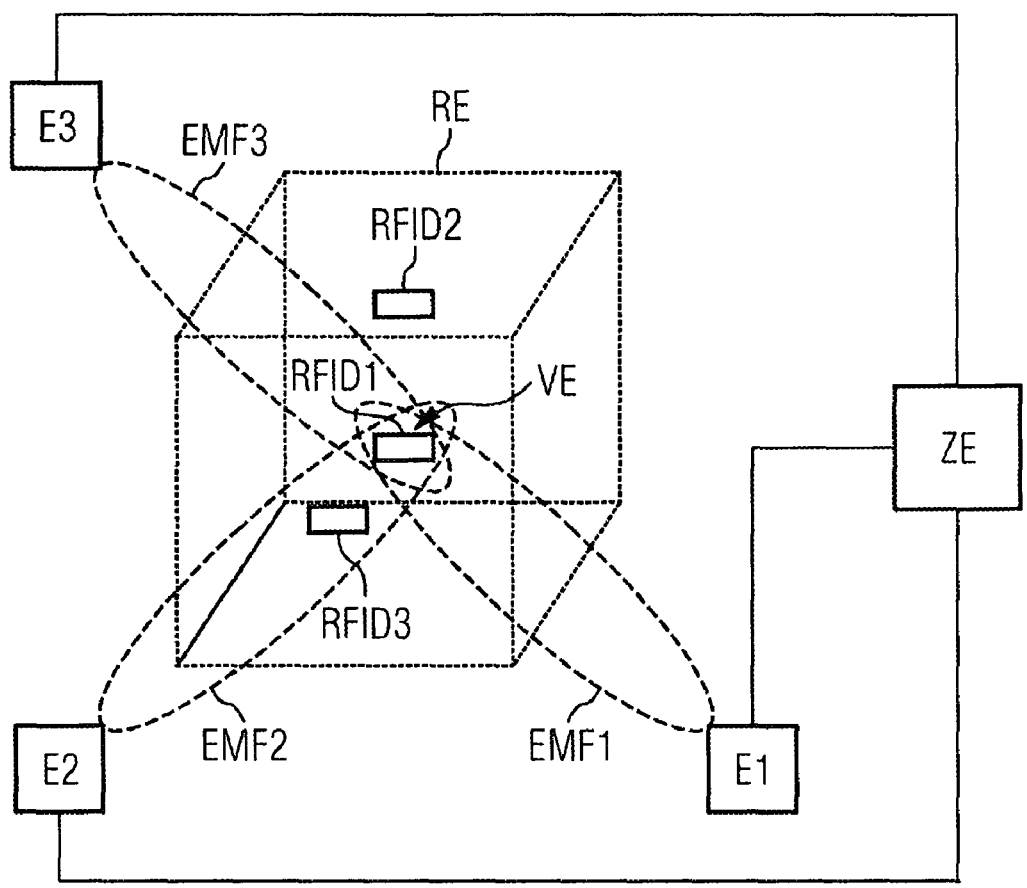
FIGS. 2a, 2b show spatial arrangements of a number of detection units

The various embodiments have the advantage that data carriers with a high concentration can be detected. The various embodiments have the further advantage that the data carriers can be activated in a spatially and temporally selective manner. The various embodiments have the further advantage that the electromagnetic alternating fields of the detection units are superimposed in such a manner that a field strength threshold value for activation of the data carriers can be exceeded spatially and temporally in a specifically predeterminable manner.

The various embodiments have the further advantage that a change in the transmit power of the detection units causes the field strength threshold value to be exceeded spatially and temporally in a specifically predeterminable manner.

According to various embodiments, an arrangement and the associated method for data acquisition between at least one detection unit E1, E2, . . . En and at least one means RFID1, RFID2, . . . RFIDn, for example an electronic data carrier, disposed in the electromagnetic alternating field EMF1, EMF2, . . . EMFn of the or each detection unit E1, E2, . . . En, the means RFID1, RFID2, . . . RFIDn only output data when a field strength threshold value Emax of the electromagnetic alternating field EMF1, EMF2, . . . EMFn is exceeded and the field strength of the electromagnetic alternating field EMF1, EMF2, . . . EMFn being configured so that the field strength threshold value Emax is exceeded for a time segment t within a volume unit VE.

The electromagnetic alternating fields EMF1, EMF2, ... EMFn of at least two detection units E1, E2, ... En are superimposed in such a manner that the field strength threshold value Emax is exceeded for a predeterminable time segment t within a predeterminable volume unit VE.

The transmit power and/or phase of at least one detection unit E1, E2, ... En is changed in such a manner that the field strength threshold value Emax is exceeded for a time segment t within a volume unit VE.

The electromagnetic alternating fields EMF1, EMF2, ... EMFn of at least two detection units E1, E2, ... En are superimposed in such a manner and the transmit power and/or phase relation to the other detection units of at least one detection unit E1, E2, ... En can be changed in such a manner that that the field strength threshold value Emax is exceeded for a predeterminable time segment t within a predeterminable volume unit VE.

At least one means RFID1, RFID2, ... RFIDn can be configured so that the respective activated means RFID1, RFID2, ... RFIDn only outputs data when a predeterminable field strength threshold value Emax is exceeded. In its simplest embodiment this threshold value results from the means RFID1, RFID2, ... RFIDn receiving sufficient energy to respond. This embodiment is by definition a characteristic of a means RFID1, RFID2, ... RFIDn but is subject to means-specific fluctuations as a result of structure. In a further embodiment the means RFID1, RFID2, ... RFIDn measures the maximum field strength and compares it with an integrated fixed value. This has the advantage that considerably greater precision of the field strength threshold value Emax can be achieved thus. In a further embodiment the field strength threshold value Emax can also be transmitted from the detection unit E1, E2, ... En by means of a signaling message to the means RFID1, RFID2, ... RFIDn, which then controls its response behavior accordingly.

At least one means RFID1, RFID2, ... RFIDn can be configured so that after the respective activated means RFID1, RFID2, ... RFIDn has output data, no further data is output by said means RFID1, RFID2, ... RFIDn for a predeterminable time segment dt. This temporal behavior of the means can be achieved for example by discharging a capacitor across a resistor. The capacitor here is charged after a response has been sent. The voltage present at the capacitor prohibits the sending of a response. A more recent response is only possible after the capacitor has been discharged. The capacitance and resistance values define the time segment dt, for example with an accuracy of +/−10%, and are fixed characteristics of the means RFID1, RFID2, ... RFIDn. In a further embodiment the length of the time segment dt can also be transmitted from the detection unit E1, E2, ... En by means of a signaling message to the means RFID1, RFID2, ... RFIDn, which then controls its response behavior accordingly and for example connects the capacitor to a corresponding resistor or selects certain values for resistance and capacitance of the capacitor. In a further embodiment the means RFID1, RFID2, ... RFIDn can also determine the time segment with the aid of other known time measuring methods, for example using a resonant circuit.

At least one means RFID1, RFID2, ... RFIDn can be configured so that said means RFID1, RFID2, ... RFIDn only outputs data when a corresponding identification code is transmitted from the detection unit by means of a signaling message to the means RFID1, RFID2, ... RFIDn. The means RFID1, RFID2, ... RFIDn compares this identification code for example with a fixed programmed value, which is a characteristic of said means RFID1, RFID2, ... RFIDn. The advantage of this method is that only a subset of all the addressed means RFID1, RFID2, ... RFIDn can be prompted specifically to respond, thus allowing mutual interference of the responses to be avoided. In one embodiment the identification code used can be a full or partial qualification of the specific identification code, for example the EPC code, of the means RFID1, RFID2, ... RFIDn, which for example includes all the means RFID1, RFID2, ... RFIDn with common characteristics such as product category, supplier, date of manufacture, etc. The advantage of this method is that only a specific group of means RFID1, RFID2, ... RFIDn is specifically addressed. In a particular secondary embodiment certain characters are used as placeholders or wildcards. These replace characters, which are not subject to the partial qualification, in other words are random. This has the advantage that the partial qualification can be selected freely. For example the supplier and goods category can be predetermined, while characters corresponding to the date of manufacture can be replaced by placeholders.

In a further embodiment the fixed impressed identification code, which prompts the means RFID1, RFID2, ... RFIDn to respond, can be an encryption of the specific identification code, for example the EPC code of the means RFID1, RFID2, ... RFIDn, or a partial qualification thereof. Because the algorithm and key are only known to authorized entities, the means RFID1, RFID2, ... RFIDn can only be read by these too.

The various embodiments allow spatial elements RE of any size to be scanned sequentially, i.e. one after the other in time, in the form of volume units VE. Only means RFID1, RFID2, ... RFIDn in a just scanned volume unit VE are activated.

The arrangement in FIG. 1 shows a schematic diagram of an arrangement according to an embodiment for data acquisition with a detection unit E1 and a number of means RFID1, RFID2, ... RFIDn, for example radio identification devices or electronic data carriers. Disposed in the detection unit E1 are a control unit ST1, a transmit/receive unit SE1 and an antenna A1. The transmit/receive unit SE1 outputs an electromagnetic alternating field EMF1 by way of the antenna A1, said electromagnetic alternating field EMF1 inducing so large a voltage in the means RFID1, RFID2, ... RFIDn when a field strength threshold value Emax is exceeded that the means RFID1, RFID2, ... RFIDn are activated to output data. The antenna A1 used can be a planar antenna, horn radiator, parabolic antenna or linear antenna for example. Adaptive antennas in particular can also be used, with which the form and strength of the electromagnetic alternating field EMF1 can be changed by phase control.

The control unit ST1 is used to determine the power and form of the electromagnetic alternating field EMF1 output by the antenna A1. This allows only means RFID1, RFID2, ... RFIDn in a predeterminable volume unit VE to be activated in a predeterminable time segment t. If the volume unit VE selected is correspondingly small, there are for example two means RFID1, RFID2 in a region of the electromagnetic alternating field EMF1 with a field strength above the threshold value Emax. Only these two means RFID1, RFID2 are activated and can output data. If, as a result of corresponding control by the control unit ST1, the volume unit VE with a field strength above the threshold value Emax moves over the entire volume region, in which means RFID1, RFID2, ... RFIDn are present, all the means RFID1, RFID2, ... RFIDn are activated in temporal sequence to output data.

FIG. 2a shows a spatial arrangement with three detection units E1, E2, E3 and three means RFID1, RFID2, RFID3 in the spatial element RE at time point t1. The detection units E1, E2, E3 are connected to one another by way of a central unit Z. The electromagnetic alternating fields EMF1, EMF2, EMF3 of the detection units E1, E2, E3 are superimposed in the volume unit VE in such a manner that the field strength in the volume unit VE is above a threshold value Emax, so that the one means RFID1 present in this volume unit VE is activated. In other words when the threshold value is exceeded, so large a voltage is induced in the means RFID1 that the means RFID1 outputs data. The output data is received by at least one detection unit E1, E2, E3 and transmitted to the central unit Z for data evaluation and further processing.

Figure 2B:
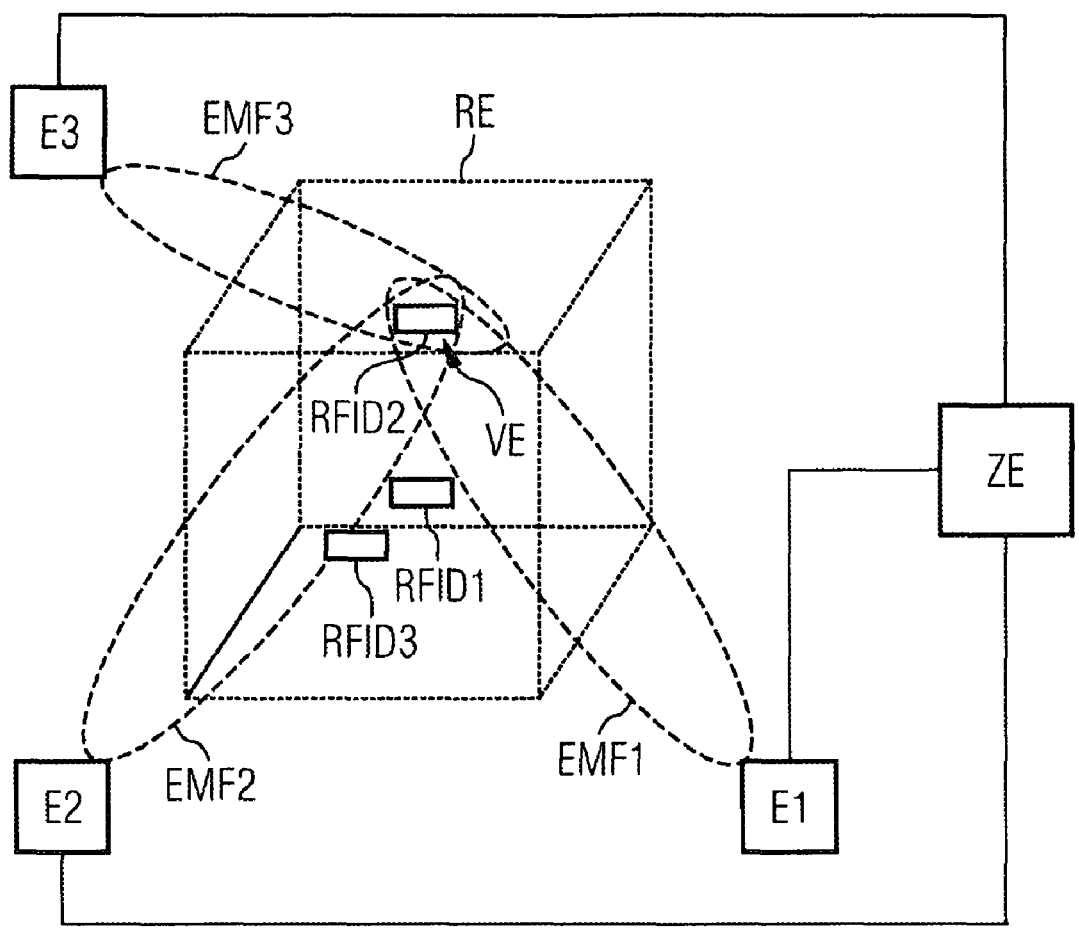

FIG. 2b shows the same arrangement as in FIG. 2a but at a later time point t2. A correspondingly changed form of the electromagnetic alternating fields EMF1, EMF2, EMF3 means that the threshold value Emax of the electromagnetic field strength is now exceeded in a spatially differently located volume unit VE, so another means RFID2 is activated and outputs data. Thus over a predeterminable time period the spatial element RE can be scanned in the form of a volume element VE by changing the electromagnetic alternating fields EMF1, EMF2, EMF3 spatially and/or in respect of power. This allows all the means RFID1, RFID2, RFID3 to be activated one after the other in time.

If in the case of high concentrations a number of means RFID1, RFID2, . . . RFIDn are disposed in a scanned volume element VE, the means RFID1, RFID2, . . . RFIDn output data one after the other in time, as the means RFID1, RFID2, . . . RFIDn are for example configured in such a manner that after activation they only output data after a respectively different delay time stored in the means RFID1, RFID2, . . . RFIDn.

The spatial element RE can also be scanned by spatial movement of one or more detection units E1, E2, . . . En, thereby activating the means RFID1, RFID2, . . . RFIDn to output data.

To prevent a means RFID1, RFID2, . . . RFIDn outputting its stored data a number of times in quick succession in the event of repeated activation, a time segment dt, within which no further data can be output, can be predetermined in the means RFID1, RFID2, . . . RFIDn.

In a further embodiment a unique identifier, for example a number, is provided for the means RFID1, RFID2, . . . RFIDn at protocol level. Only when the detection unit E1, E2, . . . En calls up the identifier are the means RFID1, RFID2, . . . RFIDn able to output data.

Figure 3:
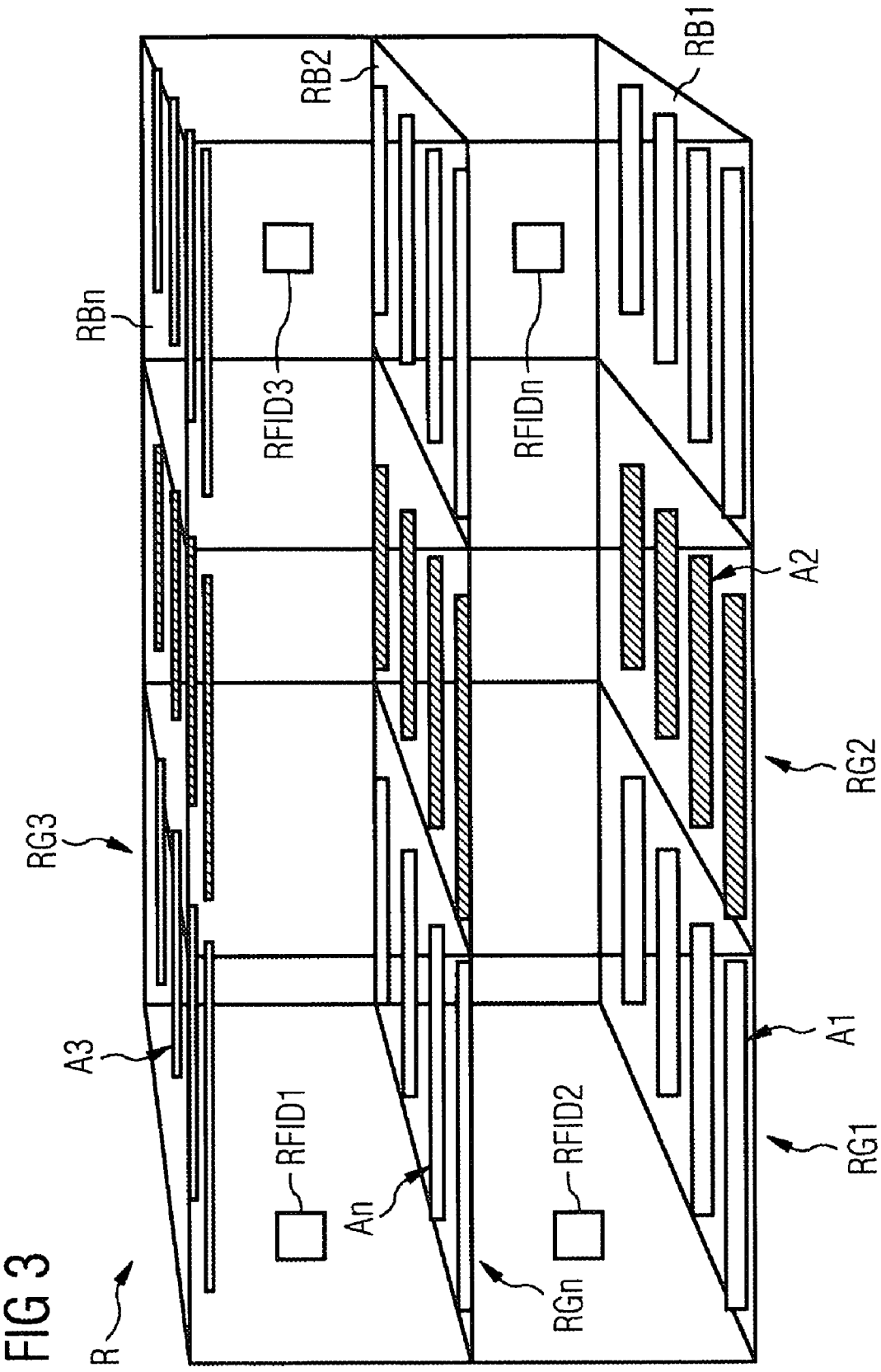
FIG. 3: shows a shelf arrangement.

FIG. 3 shows an arrangement for the segmented, section by section scanning of a large number of means RFID1, RFID2, . . . RFIDn in a shelf unit R. To this end the shelf unit R is divided into a number of shelf bases RB1, RB2, . . . RBn and these in turn are divided into a number of shelf sections RG1, RG2, . . . RGn. Each shelf section RG1, RG2, . . . RGn is assigned a detection unit E1, E2, . . . En (not shown in FIG. 3) according to various embodiments, with one or more antennas A1, A2, . . . An. This configuration has the advantage that the scanned spatial element RE can be tailored to a shelf geometry. Non-adjacent shelf sections RG1, RG2, . . . RGn can be scanned at the same time without mutual interference and the means RFID1, RFID2, . . . RFIDn output their data according to various embodiments. The shelf sections RG1, RG2, . . . RGn can be divided into subsections if required.

In one embodiment parallel linear dipole antennas are disposed within a shelf section RG1, RG2, . . . RGn. All the antennas A1, A2, . . . An are aligned in a parallel manner in the shelf direction. The length of a shelf section RG1, RG2, . . . RGn is approximately equal to the antenna length, for example equal to half the wavelength of the electromagnetic alternating field. The lateral distance between adjacent antennas A1, A2, . . . An in the same shelf section RG1, RG2, . . . RGn is smaller than or equal to the wavelength of the electromagnetic alternating field, to avoid interference. This antenna configuration allows acquisition coverage corresponding approximately to a shelf section RG1, RG2, . . . RGn. Additional shielding measures between different shelf sections RG1, RG2, . . . RGn improve the separation of different shelf sections RG1, RG2, . . . RGn. The antennas A1, A2, . . . An can also be integrated directly in the shelf bases RB1, RB2, . . . RBn.

The invention claimed is:

1. An arrangement for data acquisition between at least two detection units and electronic data carriers disposed in an electromagnetic alternating field of the detection units,
   wherein each of the electronic data carriers are operable to only output data when a field strength threshold value is exceeded, said data being detected by at least one of the at least two detection units,
   wherein each of the at least two detection units produces an electromagnetic alternating field having a field strength lower than the field strength threshold value, and
   wherein the electromagnetic alternating fields of the at least two detection units are superimposed in such a manner that the field strength threshold value is exceeded by the superimposed electromagnetic alternating fields for a time segment within a volume unit, such that each of the electronic data carriers within the volume unit during the time segment is operable to output the data.

2. The arrangement according to claim 1, wherein the electromagnetic alternating fields of the at least two detection units can be superimposed in such a manner and at least one of the transmit power and phase of at least one detection unit can be changed in such a manner that the field strength threshold value is exceeded for the time segment within the volume unit.

3. The arrangement according to claim 1, wherein at least one electronic data carrier is configured in such a manner that it outputs data after a predeterminable delay time.

4. The arrangement according to claim 1, wherein at least one electronic data carrier is configured in such a manner that after the respective activated electronic data carrier has output data, it cannot output any further data for a predeterminable time segment.

5. A method for transmitting data between at least two detection units and electronic data carriers disposed in the electromagnetic alternating field of each detection unit, the method comprising:
   each of the detection unit generating an electromagnetic alternating field having a field strength lower than a field strength threshold value required for initiating an output of data from each of the electronic data carriers,
   controlling the at least two electromagnetic alternating fields generated by the at least two detection units such that the at least two electromagnetic alternating fields are superimposed, the superimposed electromagnetic alternating fields having a field strength that exceeds the field strength threshold value within a volume unit for a time segment, and
   each of the electronic data carriers within the volume unit during the time segment outputting data in response to the field strength exceeding the field strength threshold value within the volume unit.

6. The method according to claim 5, wherein the electromagnetic alternating fields of the at least two detection units are superimposed in such a manner and at least one of the transmit power and phase of at least one detection unit is changed in such a manner that the field strength threshold value is exceeded for the time segment within the volume unit.

7. The method according to claim 5, wherein after an activated electronic data carrier has output data, it cannot output any further data for a predeterminable time segment.

8. The method according to claim 5, wherein an activated electronic data carrier only outputs data if the detection unit has previously transmitted a characteristic identifier for the activated electronic data carrier.

9. An arrangement for data acquisition comprising:
at least two detection units each operable to generate an electromagnetic alternating field having a field strength lower than a field strength threshold value,
wherein the electromagnetic alternating fields generated by the at least two detection units are superimposed within a volume unit for a time segment, the superimposed electromagnetic alternating field having a field strength that exceeds the field strength threshold value,
at least electronic data carrier operable to only output data when the field strength threshold value is exceeded at the location of the electronic data carrier, such that the electronic data carrier in response to the field strength exceeding the field strength threshold value within the volume unit during the time segment, is operable to output the data.

10. The arrangement according to claim 9, wherein the electromagnetic alternating fields of the at least two detection units are superimposed in such a manner and at least one of the transmit power and phase of at least one detection unit are changed in such a manner that the field strength threshold value is exceeded for the time segment within the volume unit.

11. The arrangement according to claim 9, wherein the one electronic data carrier is configured in such a manner that it outputs data after a predeterminable delay time.

12. The arrangement according to claim 9, wherein the one electronic data carrier is configured in such a manner that after the respective activated electronic data carrier has output data, it cannot output any further data for a predeterminable time segment.

* * * * *